(12) United States Patent
Hansen et al.

(10) Patent No.: US 12,510,053 B2
(45) Date of Patent: Dec. 30, 2025

(54) METHOD AND A SYSTEM FOR TRACKING MOTION OF A BLADE

(71) Applicant: Syddansk Universitet, Odense (DK)

(72) Inventors: Morten Hartvig Hansen, Augustenborg (DK); René Lynge Eriksen, Glamsbjerg (DK)

(73) Assignee: Syddansk Universitet, Odense (DK)

( * ) Notice: Subject to any disclaimer, the term of this patent is extended or adjusted under 35 U.S.C. 154(b) by 0 days.

(21) Appl. No.: 18/791,769

(22) Filed: Aug. 1, 2024

(65) Prior Publication Data

US 2025/0035086 A1 Jan. 30, 2025

Related U.S. Application Data

(63) Continuation of application No. 17/765,077, filed as application No. PCT/EP2020/077859 on Oct. 5, 2020, now abandoned.

(30) Foreign Application Priority Data

Oct. 3, 2019 (EP) .................................... 19201291

(51) Int. Cl.
*F03D 7/04* (2006.01)
*F03D 17/00* (2016.01)
*G01M 5/00* (2006.01)

(52) U.S. Cl.
CPC ............. *F03D 7/042* (2013.01); *F03D 17/00* (2016.05); *G01M 5/0016* (2013.01); *G01M 5/0041* (2013.01); *G01M 5/0091* (2013.01)

(58) Field of Classification Search
CPC ...... F03D 7/042; F03D 174/00; F03D 7/0204; F03D 7/0224; F03D 17/00; G01M 5/0016;

(Continued)

(56) References Cited

U.S. PATENT DOCUMENTS 6,480,289 B1 * 11/2002 Shimomura ........... G01B 11/16
356/614
9,447,773 B2 9/2016 Egedal et al.
(Continued)

FOREIGN PATENT DOCUMENTS

CN 101900741 A 12/2010
DE 10065314 A1 7/2002
(Continued)

OTHER PUBLICATIONS

Chinese Office Action for Application No. 202080083077.3, dated Jun. 20, 2024, 9 pages.

*Primary Examiner* — Aaron R Eastman
(74) *Attorney, Agent, or Firm* — DINSMORE & SHOHL LLP (57) ABSTRACT

A method and system is for tracking motion of a wind turbine blade. A blade motion tracking system is for installation on a wind turbine blade with a blade root and tip. The system has at least one light module with at least a first light source, preferably adapted to emit light in the blade root direction. An optical measuring device at the blade root may receive light emitted from the first source. The optical measuring device may be a position sensitive detector identifying the first light source position relative to the position sensitive detector. A single light source located at, close to, or towards the tip, is sufficient to measure blade deflection. The first light source is modulated with a predefined frequency such that light from the first light source can be distinguished from ambient light and thereby minimize the influence of the ambient light conditions during detection.

19 Claims, 8 Drawing Sheets

(58) Field of Classification Search
CPC ............. G01M 5/0041; G01M 5/0091; G01M 11/081; Y02E 10/72; G01B 11/16; B64C 27/008; F05B 2270/804
See application file for complete search history.

(56) References Cited

U.S. PATENT DOCUMENTS

| | | | |
|---|---|---|---|
| 2009/0321555 A1 | 12/2009 | Nitzsche et al. | |
| 2010/0143128 A1 | 6/2010 | McCorkendale | |
| 2010/0209247 A1 | 8/2010 | Becker et al. | |
| 2011/0103933 A1* | 5/2011 | Olesen | F03D 17/00 415/118 |
| 2011/0150647 A1 | 6/2011 | Gierlich et al. | |
| 2011/0154907 A1* | 6/2011 | Schmidt | G01M 11/08 73/800 |
| 2012/0132012 A1* | 5/2012 | Weigel | G01B 11/16 73/862.624 |
| 2012/0200444 A1 | 8/2012 | Andersen et al. | |
| 2012/0303277 A1 | 11/2012 | Fu et al. | |
| 2013/0093879 A1 | 4/2013 | Bertolotti | |
| 2013/0136594 A1 | 5/2013 | Casazza et al. | |
| 2014/0054476 A1* | 2/2014 | Zheng | F03D 17/00 250/578.1 |
| 2015/0159632 A1 | 6/2015 | Vangen et al. | |
| 2015/0240787 A1 | 8/2015 | Byskov et al. | |
| 2015/0252789 A1 | 9/2015 | Bunge | |
| 2016/0327521 A1* | 11/2016 | Xia | G01M 5/0091 |
| 2020/0260013 A1* | 8/2020 | Kaufmann | F03D 17/00 |
| 2023/0175917 A1* | 6/2023 | Meissner | G01M 5/0091 |

FOREIGN PATENT DOCUMENTS

| | | |
|---|---|---|
| DE | 202007008066 U1 | 10/2008 |
| EP | 2511524 A1 | 10/2012 |
| EP | 2778602 A1 | 9/2014 |
| WO | 2009143848 A2 | 12/2009 |
| WO | 2010/089139 A1 | 8/2010 |
| WO | 2011/134473 A1 | 11/2011 |
| WO | 2020061290 A1 | 3/2020 |

\* cited by examiner

METHOD AND A SYSTEM FOR TRACKING MOTION OF A BLADE

CROSS REFERENCE TO RELATED APPLICATION

This application is a continuation of U.S. application Ser. No. 17/765,077, filed Mar. 30, 2022, which claims priority to national-stage application under 35 U.S.C. § 372 of International Application No. PCT/EP2020/077859, filed Oct. 5, 2020, which International Application claims benefit of priority to European Patent Application No. 19201291.2, filed Oct. 3, 2019.

The present invention relates to a method and a system for tracking the motion of a blade of a wind turbine.

BACKGROUND OF THE INVENTION

It is known to provide a wind turbine with monitoring systems including blade deflection systems to provide indications of the deflection of the wind turbine blades during operation. Such information about the deflection of the blades can be used in the controlling of the wind turbine, such as the pitching of the blades, in order to avoid a tower collision of a blade.

In WO2010/089139 there is disclosed a device for measuring deformations of a wind turbine rotor blade containing an optically detectable marking along the blade axis and camera containing a matrix sensor. The objective of the camera is aligned toward the optically detectable marking, such that the marking is depicted on the matrix sensor. The image data of the camera are fed to an image processing device set up for determining the position of the marking within the image field by means of an image detection and converted into an object deformation.

From US 2010/0209247 A1 there is known a method to determine the bending and twisting of a rotor blade based on the signal from an inclinometer arrangement on each rotor blade during operation of the wind turbine. The sensors are combined with a speed sensor in the rotor and both communicating with a control unit for monitoring.

WO 2011/134473 is describing a system to determine the angular deflection of a wind turbine blade. The system is based on an inclinometer at the tip and root end of the blade respectively.

WO 2009/143848 discloses a wind turbine rotor comprising at least one wind turbine blade, more than one light sources connected to the blade, at least one light registering device arranged to register light emitted from the light sources, and wherein twisting of the blade will produce a change in the position of the more than one light sources in relation to the light registering device and wherein this change in the position can be registered by means of the light registering device.

EP 2778602 discloses an arrangement for determining the deflection of a blade of a wind turbine where a transmitter is arranged close to the tip end of the blade, while a receiver is arranged close to the root end of the blade. The transmitter and the receiver are prepared for a wireless transfer of a monitoring signal, which is sent from the transmitter to the receiver. A monitoring system is arranged close to the root end of the blade to generate the monitoring signal for transferring to the transmitter. The monitoring system is also connected with the receiver and prepared to determine the deflection of the blade based on the transferred monitoring signal.

Besides the deflection having an influence on the blades, it is also well-known that the torsion of the blades has an influence on the aerodynamic performance of a wind turbine blade. However, the known monitoring systems are not capable of monitoring any torsion of the blades during operation in a satisfactory manner. Moreover, the known monitoring systems are found to be vulnerable to various operational factors, as the systems are mounted on the blades; for instance, the visibility of cameras and inclinometers are sensitive to vibrations, gravity and centrifugal accelerations. Furthermore, the known monitoring systems can be power consuming in operation.

On this background it is a purpose of the present disclosure to provide an improved system and method for monitoring the blade motion during operation of a wind turbine.

SUMMARY OF THE INVENTION

In a first aspect of the invention there is provided a blade motion tracking system for installation on a wind turbine blade, where the wind turbine blade comprises a blade root and a blade tip. The system comprises at least one light module comprising at least a first light source, preferably adapted to emit light in the direction of the blade root. An optical measuring device is provided which is adapted to receive light emitted from the first light source(s). The optical measuring device preferably comprises at least one position sensitive detector identifying the position of the first light source relative to the position sensitive detector(s). If the first light source(s) is on the blade, the optical measuring device, or at least the position sensor thereof, is preferably located in a place that follows the rotation of the blade, such as the blade root. In general the light source(s) is typically adapted to emit light towards at least one position sensor of the optical measuring device, and a light source and the corresponding position sensor are preferably located at substantially opposite ends of a blade. Hence, in principle the light source could be located closer to the blade root than the corresponding position sensitive detector.

A single light source located close to the tip of the blade is sufficient to measure deflection of the blade. Advantageously the first light source is modulated with a predefined modulation frequency such that light from the first light source can be distinguished from ambient light and thereby minimize the influence of the ambient light conditions during detection.

A further embodiment of the presently disclosed blade motion tracker system includes at least a second light source whereby it is possible to measure both torsion and bending deflection of a blade. Hence, a blade motion tracking system for installation on a wind turbine blade is provided, where the wind turbine blade comprises a blade root and a blade tip, and a leading edge and a trailing edge with a chord length extending therebetween of each blade section; said system comprising at least one light module comprising a first light source and a second light source provided on, or close to, the leading edge and the trailing edge respectively in a blade section, preferably at a predetermined distance from the blade root, said first and second light sources being adapted to emit light, for example in the direction of the blade root. Similarly an optical measuring device can be provided, for example at the blade root, adapted to receive the light emitted from the light sources, and wherein the optical measuring device is a position sensitive detector identifying the position of each of the first and second light sources relative to the position sensitive detector. Advantageously the light sources are modulated with predefined— and preferably different—modulation frequencies such that light from the first light sources can be distinguished from ambient light—and from each other if they are modulated with different predefined modulation frequencies.

In a second aspect of the present disclosure, there is provided a method for tracking the motion of a blade of a wind turbine, where the wind turbine blade comprises a blade root and a blade tip, the method comprising the steps of:

providing at least a first light module comprising at least a first light source, preferably provided towards, on or near the blade tip, said first light source preferably adapted to emit light in the direction of the blade root; and providing a position sensitive detector, preferably at the blade root, adapted to receive the light emitted from the first light source of said first light module, and identifying the relative position of the first light source in the position sensitive detector. Advantageously the first light source is modulated with a predefined modulation frequency such that light from the first light source can be distinguished from ambient light and thereby minimize the influence of the ambient light conditions during detection.

A further embodiment relates to a method for tracking the motion of a blade of a wind turbine, where the wind turbine blade comprises a blade root and a blade tip, and a leading edge and a trailing edge with a chord length extending therebetween of each blade section; the method comprising the steps of:

providing at least a first light module comprising a first light source and a second light source provided on the leading edge and the trailing edge, respectively, in a predetermined blade section, preferably near the blade tip, said first and second light sources being adapted to emit light, preferably in the direction of the blade root; and providing an optical measuring device, preferably at the blade root, adapted to receive the light emitted from the light sources of said first light module, and identifying the relative position of each of the light sources in the optical measuring device is a position sensitive detector. Advantageously the light sources are modulated with predefined—and preferably different—modulation frequencies such that light from the first light sources can be distinguished from each other and from ambient light.

A Position Sensitive Device and/or Position Sensitive Detector (PSD) is an optical position sensor that can measure a position of a light spot in one or two dimensions on a sensor surface. Such position sensitive detectors are commercially available. PSDs can be divided into two types relying on different detection and analysis principles. Discrete PSDs has discrete sensors in a raster-like structure on the sensor surface that supply local discrete data, like a charged coupled device (CCD) or Complementary metal-oxide-semiconductor (CMOS) sensor. Post-processing of the signal from discrete PSDs is necessary in order to convert to position Non-discrete PSDs (typically also analogue) have an isotropic sensor surface utilizing photodiode surface resistance. The advantage of a non-discrete PSD is that it supplies high-speed continuous position data with high position resolution and high reliability, wide spectral response range, simultaneous measurements of position and intensity and wherein position is measured almost independent of the light-spot size. A non-discrete PSD can be provided at a much lower cost in a rugged design providing a reliable and fast position detection in one or two dimensions. By the present invention it is therefore found advantageous to use a non-discrete position sensitive detector for tracking the motion of a blade of a wind turbine. It is found that using a non-discrete PSD for one- or two-dimensional detection and a single frequency modulated light source to be detected allows for tracking bending of a wind turbine blade during operation. It is also found that using a non-discrete PSD for two dimensional detection and also providing two light sources to be detected allows for tracking both bending and torsion of a wind turbine blade during operation.

A system according to the invention is relatively inexpensive and reliable as it can be made using standard components. The presently disclosed blade motion tracking system is suitable for installation as part of a wind turbine system. It can be an add-on/temporary system that may sit for a period or an integral part of the wind turbine system. The data processing is not involving any image recognition as the blade section motion is directly given by the one or two positions detected by the position sensitive device (PSD), in particular if a non-discrete PSD is used as explained herein. The rate of data recording is therefore only limited by the data processing and storage system. Compared to known systems, the PSD is advantageous in that it is a much faster system, in particular when using a non-discrete PSD, and therefore the data rate can be significantly higher. Data acquired by the presently disclosed system and method, can be stored locally, and/or transmitted (cabled or wirelessly) to a local or central processing or storage unit. The data may also be used as input to a control/security system of the wind turbine system. A further advantage is therefore that the system according to the invention can be made as a permanent system on wind turbines to provide the wind turbine controller with information about the edgewise and flapwise translations and optionally torsion of the blade section in the full life-time of the blade, when using one or more than one light source. The one or more light sources on the blade section are advantageously designed for minimum influence on the aerodynamic performance of the blade.

Modulation of the light source(s) by one or more predefined frequencies is an advantage even if only one light source is used, because the environment of a wind turbine blade is typically in open-air and is thereby quite rugged and the signal incident on the optical measuring device can be polluted by many different types of ambient light. If the single light source, or at least the output therefrom, is modulated with a predefined modulation frequency, it is much easier to recognize, identify and detect the light from the single light source in order to suppress and/or minimize the influence from sources of ambient light.

As stated herein bending and torsion of a wind turbine blade can be measured with the presently disclosed system employing at least two light sources and a two-dimensional PSD. Such a setup may be very suitable for prototype testing of wind turbine blades, where it is an advantage if any deflection of the wind turbine blade can be monitored. During normal operation of a wind turbine it might only be necessary to monitor the bending (and not the torsion) of one or more of the blades. As stated herein bending of a wind turbine blade can be measured with the presently disclosed system employing a single light source and a one-dimensional PSD, i.e. a low-cost solution which can be provided in a rugged package such that it can be provided on the wind turbine during the life-time of the wind turbine blades.

The ability to online track the blade motion in edgewise and flapwise bending and optionally torsion with a high availability and accuracy using an inexpensive and reliable system provides for significant load reductions and moderate power performance enhancement are possible, which again enables the design of larger and lighter wind turbine rotors.

Preferably, the light module is provided near the tip of the blade. At this position, the largest bending and torsion of the blade predictably occur, and it is therefore useful to measure the bending and torsion of the blade at this position. However, it is also possible to measure bending and optionally torsion with the light module located closer to the blade root, e.g. halfway between the blade root and the blade tip.

As stated herein the first light source and the second light source can be provided on, or close to, the leading edge and the trailing edge, respectively, in a blade section at a predetermined distance from the blade root. There are many ways to install multiple light sources across the leading edge and the trailing edge of the blade, such that torsion can be measured. As stated above, a first light source can be provided on or close to the leading edge and a second light source can be provided on or close to the trailing edge, i.e. as long as one light source is closer to the trailing edge and another light source is closer to the leading edge, the torsion can be measured. But the closer the light sources are to the leading and trailing edges, respectively, the larger the difference signal between the light sources become. It might even be possible to have light sources extending beyond the leading and/or trailing edges, e.g. by attaching the light sources to at least one rod, or similar, extending across and possibly beyond the leading and/or trailing edges, such that the torsion signal becomes more powerful. Such a setup is mostly suitable for testing a wind turbine blade prototype.

In order to achieve an accurate result in the position sensitive detector, the position sensitive detector may be provided with a lens and an optical filter adapted to receive the light from the first and optionally second light sources through said lens and said filter. By the lens, the light is focused in the PSD and the optical filter reduces significantly the influence of ambient light distortion and saturation on the optical detector.

In an embodiment of the invention, the light source(s) is frequency modulated, and optionally synchronised in case of more than one light source. In case of one light source the light source is frequency modulated to distinguish the light from ambient light conditions. In case of more than one light source the light sources are modulated with different frequencies to distinguish the two light sources in the PSD and to distinguish the light sources from ambient light conditions. Furthermore, the light source(s) may preferably be configured for emitting light in the infrared or near infrared wavelength range in order to avoid that the emitted light is visible for the human eye.

Advantageously, the position sensitive detector further comprises a signal processing system for filtering and/or demodulating the output signal to identify the relative position of the first light source and/or each of the first and second light sources.

In an embodiment of the invention, one or more further light modules provided in one or more blade sections between the root and the tip region, and wherein the optical measuring device is capable of identifying each of the light source in the multiple light modules. Hereby, it is possible to monitor the blade motion along the length of the blade. Accordingly, a multiple of modulation frequencies are preferably used for the light sources, so that the individual light sources can be individually identified by the PSD. The light source may be a laser, an LED and/or any other suitable light sources. Optical fibres mounted in the blades through can transmit the light to the light sources such that no electrical signals are provided in the blade. Alternatively, the light source(s) can be self-sustained, e.g. battery powered or generator powered, such as a gravity-based or micro-scale wind turbine based power generator.

In a further embodiment several position sensitive detectors are used, e.g. used in combination and/or distributed along the wing, e.g. for detection of many different light sources.

The blade has an airfoil profile with a pressure side and a suction side, which during operation normally face towards the windward (or upwind) side and the leeward (or downwind) side, respectively. Advantageously, the light sources are provided on the suction side of the wind turbine blades, to that the light sources can be detected when the wind turbine blades are bending during operation.

DESCRIPTION OF DRAWINGS

In the following the invention is described with reference to the accompanying drawings, in which.

DETAILED DESCRIPTION

Figure 1:
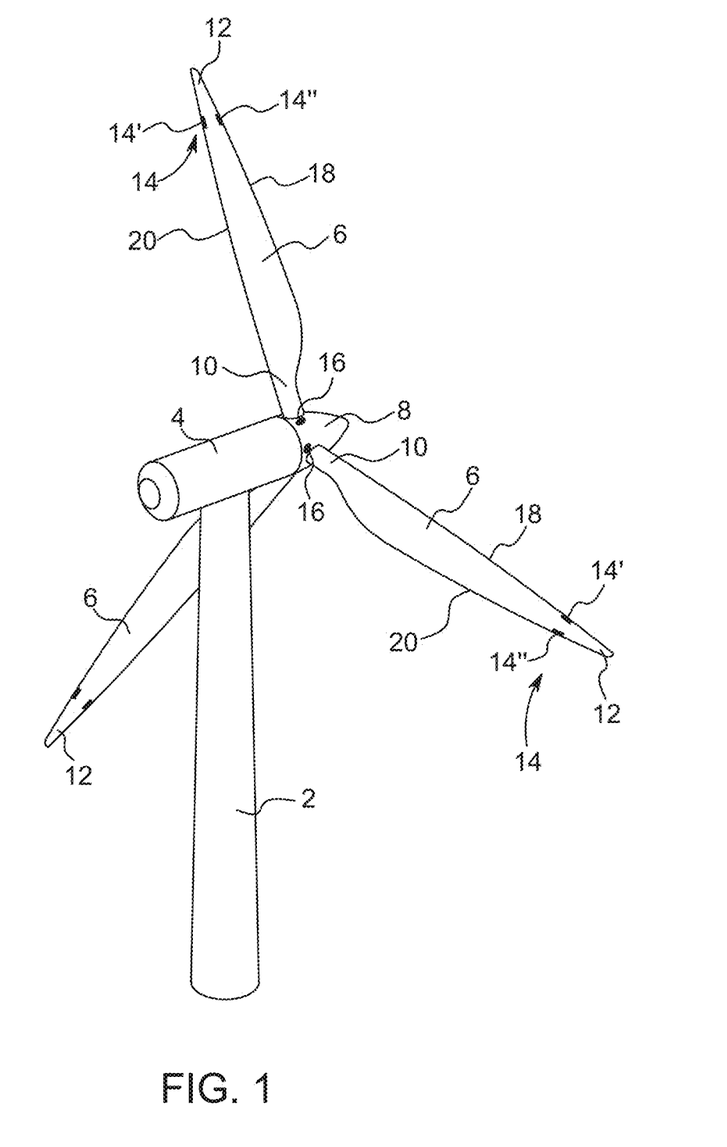
FIG. 1 is a schematic perspective view of a wind turbine to which the invention pertains.

FIG. 1 shows a wind turbine of the kind to which the invention pertains. The wind turbine comprises a substantially vertical tower 2, a nacelle 4 and a rotor with a substantially horizontal rotor shaft. The rotor includes three blades 6 mounted in a hub 8. The blades 6 extend radially from the hub 8, and comprise a blade root 10 where the blades 6 are mounted to the hub 8 and a blade tip 12 furthest from the hub 8. The blades 6 have a leading edge 18 and a trailing edge 20.

In the blade tip 12, a light module 14 is provided. The light module 14 comprises a first light source 14' on the leading edge 18 of the blade 6 and a second light source 14" on the trailing edge 20 of the blade 6. The light sources 14', 14" are directed along the blade 6 on which they are mounted toward the hub 8. On the hub 8 at the foot of each blade 6 or at the blade root 10, an optical measurement device 16 is provided.

Figure 2:
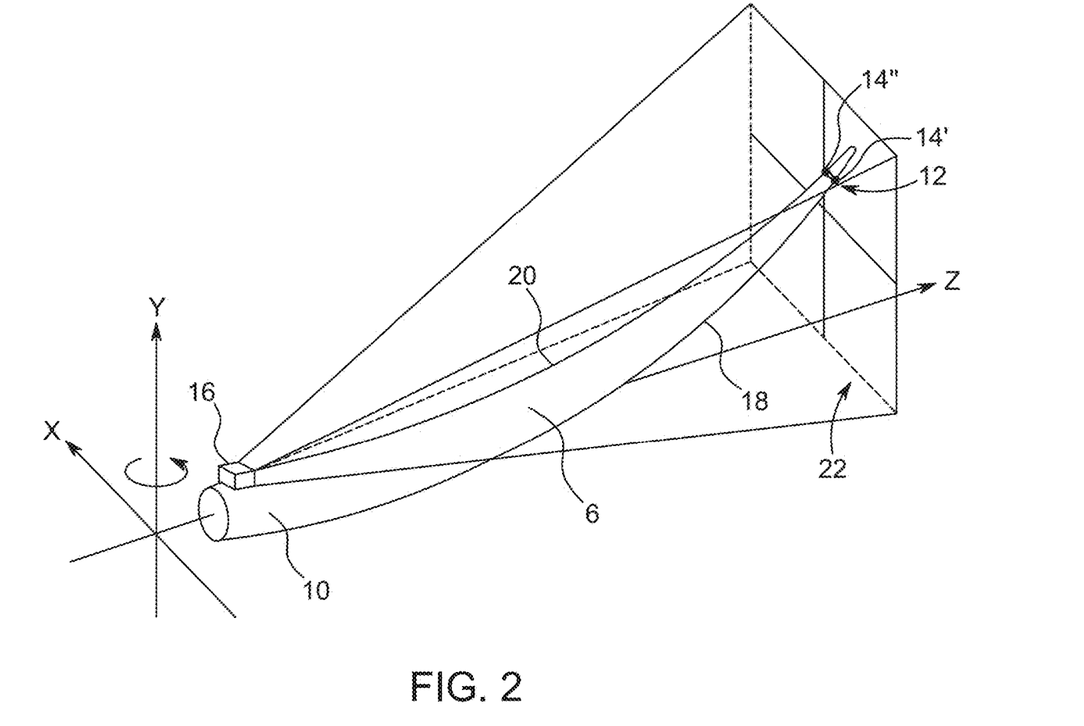
FIG. 2 is a perspective schematic view of an embodiment of the invention.
Figure 3:
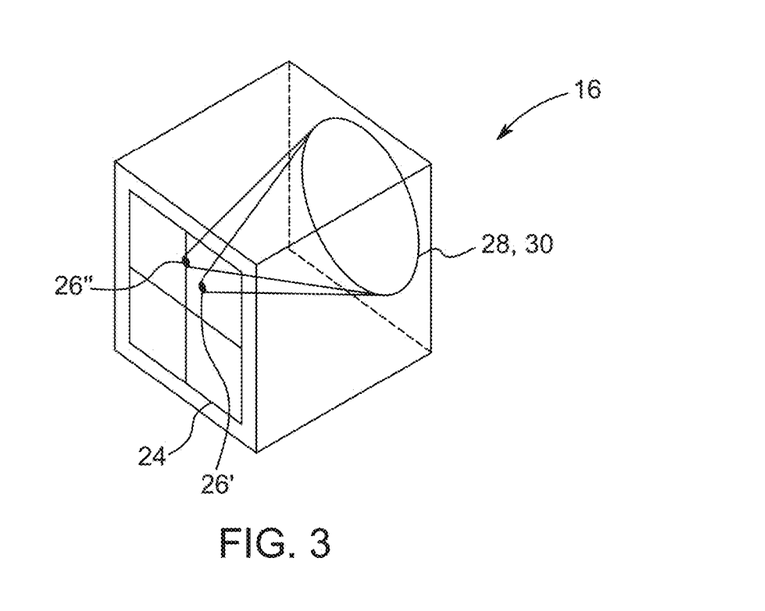
FIG. 3 is a schematic illustration of a position sensitive detector according to an embodiment of the invention.

With reference also to FIGS. 2 and 3, the optical measuring device 16 and two light sources 14', 14" are mounted on a particular blade cross-section of the blade 6. The optical measuring device 16 is mounted on the blade root 10 and pointed towards the light sources 14', 14". The blades of the rotor will bend during operation. The light sources 14', 14" and the optical measuring device 16 are provided on the rear side of the blades 6, i.e. the suction side of the blade at the leeward (or downwind) side during operation in order to ensure an uninterrupted visible connected between the components when the blade 6 bends during operation due to the wind loading. The area of vision of the optical measuring device 16 is aligned with the blade coordinate system and its size at the light sources 14', 14" is large (as indicated by the x-y coordinate system 22 at the position of the light sources 14', 14") and designed to fit the possible motion of the blade section of the light sources 14', 14". As an example, the light sources 14', 14" can be produced by optical fibers connected to a source at the blade root 10, or by self-sustained LEDs with a gravity-based power generator. Inside the optical measuring device 16, the light sources are projected onto a position sensitive detector (PSD) 24, where a lens 28 and an optical filter 30 has collected and focused the light into the dots 26' and 26" corresponding to the leading edge 18 and trailing edge 20, respectively.

Figure 4:
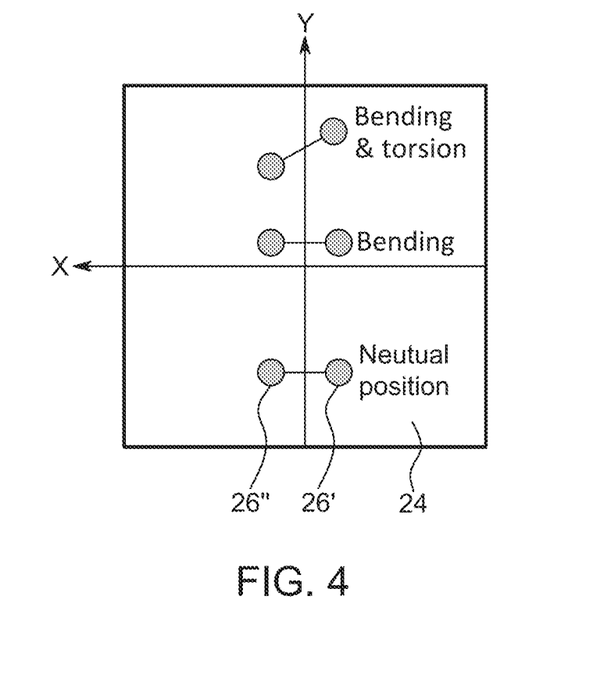
FIG. 4 is a schematic illustration of the image of two light spots on a position sensor detector.

FIG. 4 illustrates ideally how the image of two light spots from two light sources 14', 14" is located on the front surface of the PSD module 24 under three different blade bending conditions, neutral position, only blade bending and with both blade bending and blade torsion present.

Figure 5:
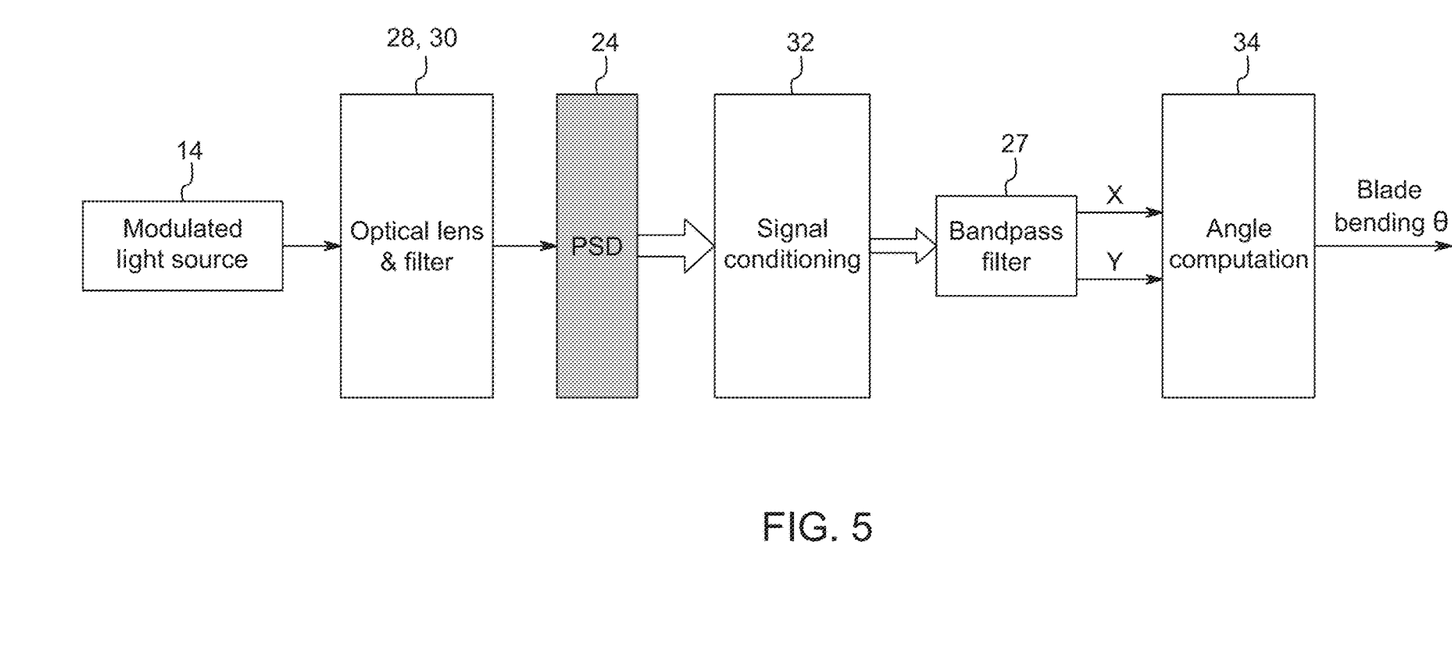
FIG. 5 is a block diagram for non-synchronized blade bending detection according to one embodiment of the invention.
Figure 6:
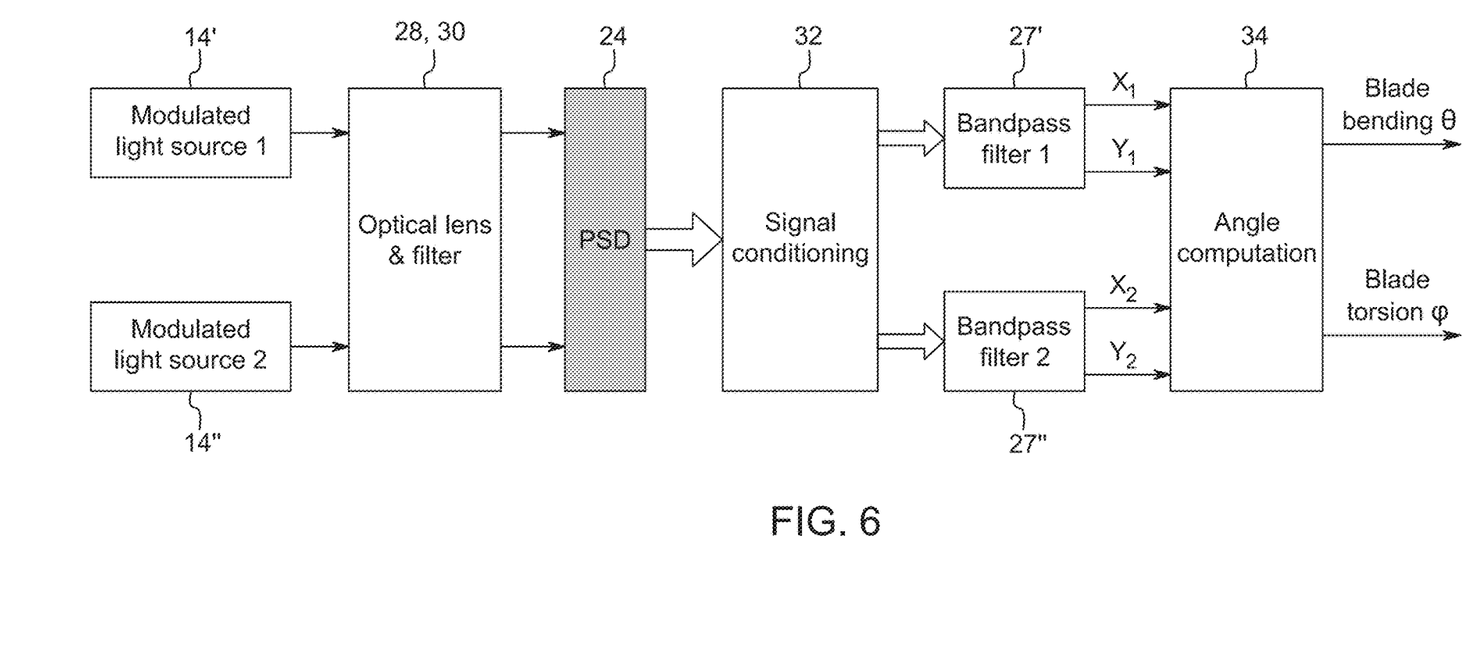
FIG. 6 is a block diagram for non-synchronized blade bending and blade torsion detection according to one embodiment of the invention.

By using the PSD 24 according to the invention, it is possible to achieve on-line tracking of the blade motion with a sufficiently high data rate that can monitor the oscillations and vibrations in the blade in real-time. With reference to FIGS. 5 and 6, examples are described of how the signal processing may be carried out.

FIG. 5 shows an example in the form of a block diagram for non-synchronized blade bending detection according to one embodiment of the invention.

In this non-synchronized detection scheme, the light source 14 frequency modulated with frequency f matched to the center frequency fc of a bandpass filter 27, to minimize background light influence. As an example, the frequency f could be 1000 Hz. In front of the optical based PSD 24 both a focusing lens 28 and an optical bandpass filter 30 with a center wavelength matched to the emission wavelength of the light source 14 are mounted. The optical filter 30 reduces significantly the influence of ambient light distortion on the optical detector 24. However, also a predefined frequency modulation of the light source 14 help to distinguish the light source 14 from the ambient light. In the signal conditioning device 32, the output current from the PSD 24 is converted to voltage, amplified, noise filtered and conditioned according to the specific PSD 24 used. A typical PSD module 24 has four output signals, from which the X and Y components can be calculated. After the signals have passed through bandpass filter 27 the x- and y-positions for light source 14 are available. In order to determine the actual blade bending θ, an arithmetic calculation can to be carried out in the angle computation device 34.

FIG. 6 shows an example block diagram for non-synchronized blade bending and blade torsion detection according to one embodiment of the invention.

In this non-synchronized detection scheme, each of the two light sources 14', 14" are frequency modulated with frequencies $f_1$ and $f_2$ matched to the center frequencies $f_{c1}$ and $f_{c2}$ of a first bandpass filter 27' and a second bandpass filter 27", respectively, to minimize background light influence. As an example, the frequencies could be 1000 Hz and 3000 Hz, respectively. In front of the optical based PSD 24 both a focusing lens 28 and an optical bandpass filter 30 with a center wavelength matched to the emission wavelength of the light sources 14', 14" are mounted. The optical filter 30 reduces significantly the influence of ambient light distortion on the optical detector 24. However, also a predefined frequency modulation of the light sources help to distinguish the light sources from the ambient light. In the signal conditioning device 32, the output currents from the PSD 24 is converted to voltages, amplified, noise filtered and conditioned according to the specific PSD 24 used. A typical PSD module 24 has four output signals, from which the X and Y components can be calculated. After the signals have passed through bandpass filters 27' and 27", respectively the x- and y-positions for light sources 14' and 14" are available. In order to determine the actual blade bending θ and blade torsion φ, arithmetic calculations can to be carried out in the angle computation device 34.

Figure 7:
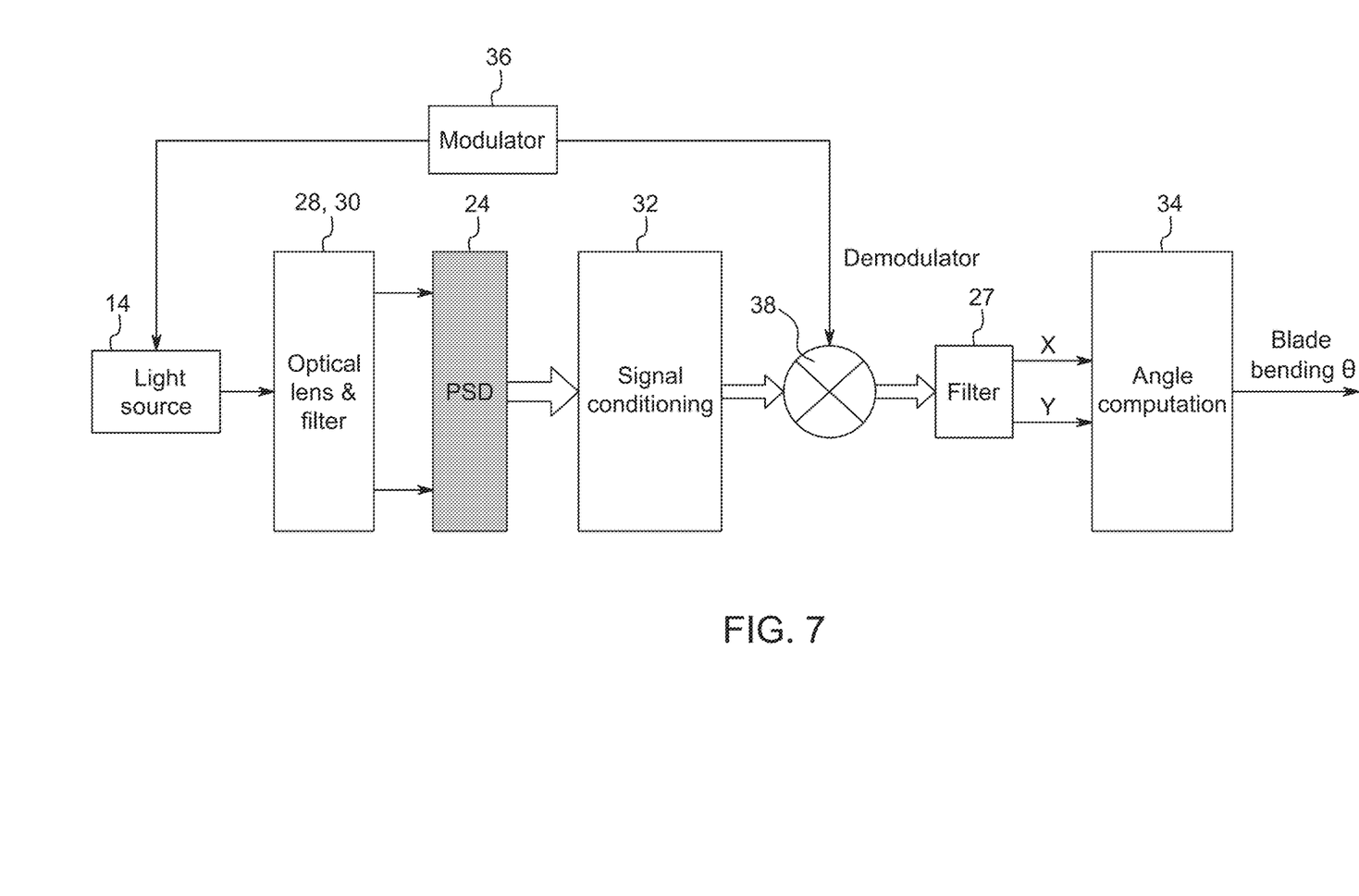
FIG. 7 is a block diagram for synchronized blade bending detection according to another embodiment of the invention.

FIG. 7 shows an example block diagram for synchronized blade bending detection according to another embodiment of the invention. The synchronized detection is found advantageous as the signal-to-noise ratio can be improved and that the light intensity and thereby the power consumption of the light sources thereby can be reduced.

In this synchronized detection scheme, the light source is frequency modulated with frequency f determined by the modulator 36. As an example, the frequency could be 1000 Hz. In front of the optical based PSD 24 both a focusing lens 28 and an optical bandpass filter 30 with a center wavelength matched to the emission wavelength of the light source 14 is mounted. The optical filter 30 reduces significantly the influence of ambient light distortion on the optical detector 24. In the signal conditioning device 32, the output current from the PSD 24 is converted to voltage, amplified, noise filtered and conditioned according to the specific PSD 24 used. A typical PSD module 24 has four output signals, from which the X and Y components can be calculated. In the Demodulators 38 the modulator signal is mixed with the conditioned signals from the PSD module 24. The output from the demodulators 38 is lowpass filtered with a frequency corresponding to the required time constant of the overall system. After proper signal filtering the x and y-positions for light source 14 are available. In order to determine the actual blade bending θ, an arithmetic calculation can to be carried out in the angle computation device 34.

Figure 8:
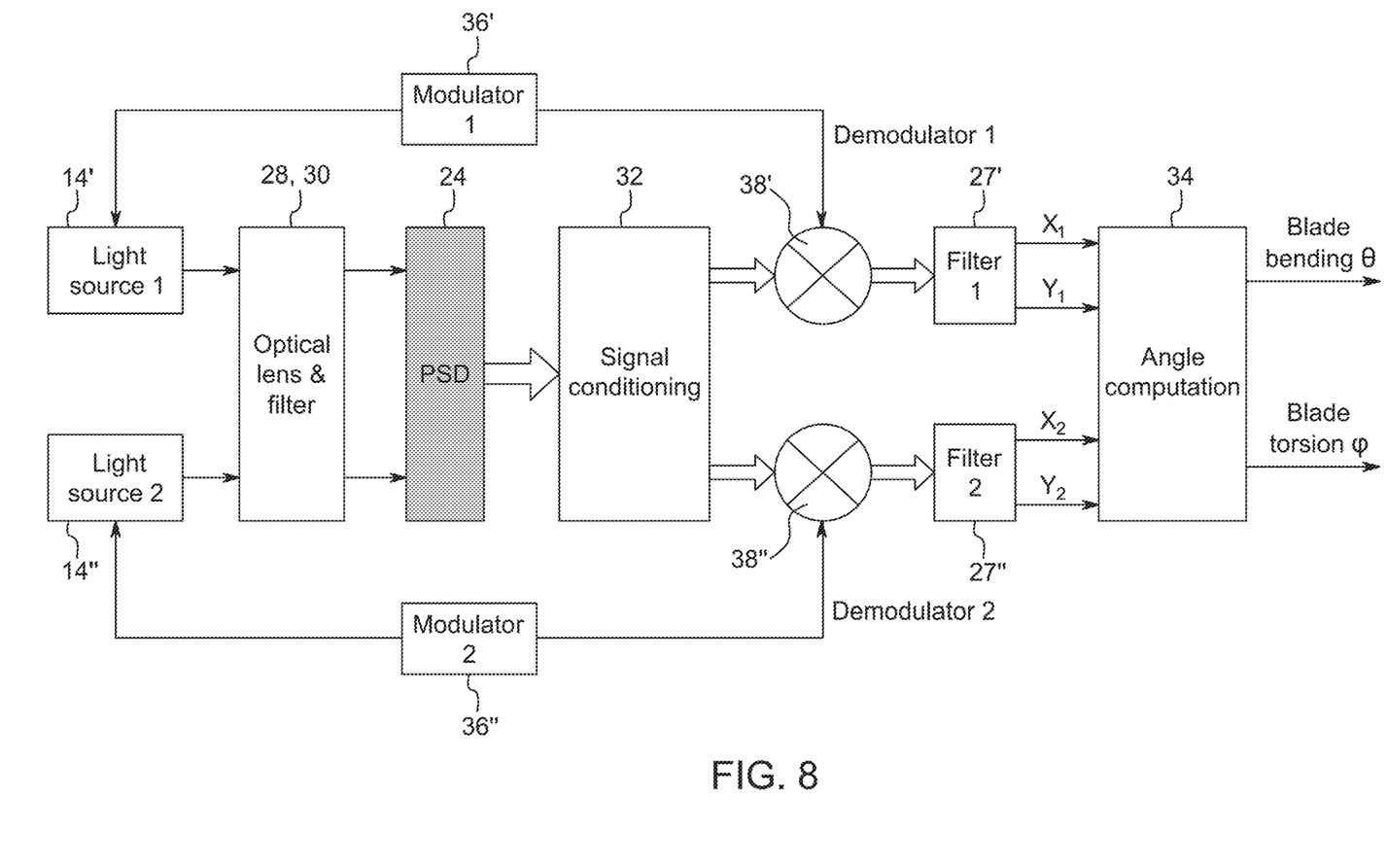
FIG. 8 is a block diagram for synchronized blade bending and blade torsion detection according to another embodiment of the invention.

FIG. 8 shows an example block diagram for synchronized blade bending and blade torsion detection according to another embodiment of the invention. The synchronized detection is found advantageous as the signal-to-noise ratio can be improved and that the light intensity and thereby the power consumption of the light sources thereby can be reduced.

In this synchronized detection scheme, each of the two light sources are frequency modulated with two different frequencies $f_1$ and $f_2$ determined by the modulators 36' and 36". As an example, the frequencies could be 1000 Hz and 3000 Hz respectively. In front of the optical based PSD 24 both a focusing lens 28 and an optical bandpass filter 30 with a center wavelength matched to the emission wavelength of the light sources 14', 14" are mounted. The optical filter 30 reduces significantly the influence of ambient light distortion on the optical detector 24. In the signal conditioning device 32, the output currents from the PSD 24 are converted to voltages, amplified, noise filtered and conditioned according to the specific PSD 24 used. A typical PSD module 24 has four output signals, from which the X and Y components can be calculated. In the Demodulators 38' and 38" the modulator signals are mixed with the conditioned signals from the PSD module 24. The output from the demodulators 38', 38" are lowpass filtered with a frequency corresponding to the required time constant of the overall system. After proper signal filtering the x and y-positions for light source 14' and 14" are available. In order to determine the actual blade bending $\theta$ and blade torsion $\phi$, arithmetic calculations can to be carried out in the angle computation device 34. Thus, the determination of the blade motion by edgewise and flapwise translations and torsional rotation can be detected in real time and can be used for controlling the wind turbine during its operation. By the present disclosure it is further realized that more blade sections can be tracked by using more light modules 14 with light sources 14', 14" having different modulation frequencies.

Figure 9:
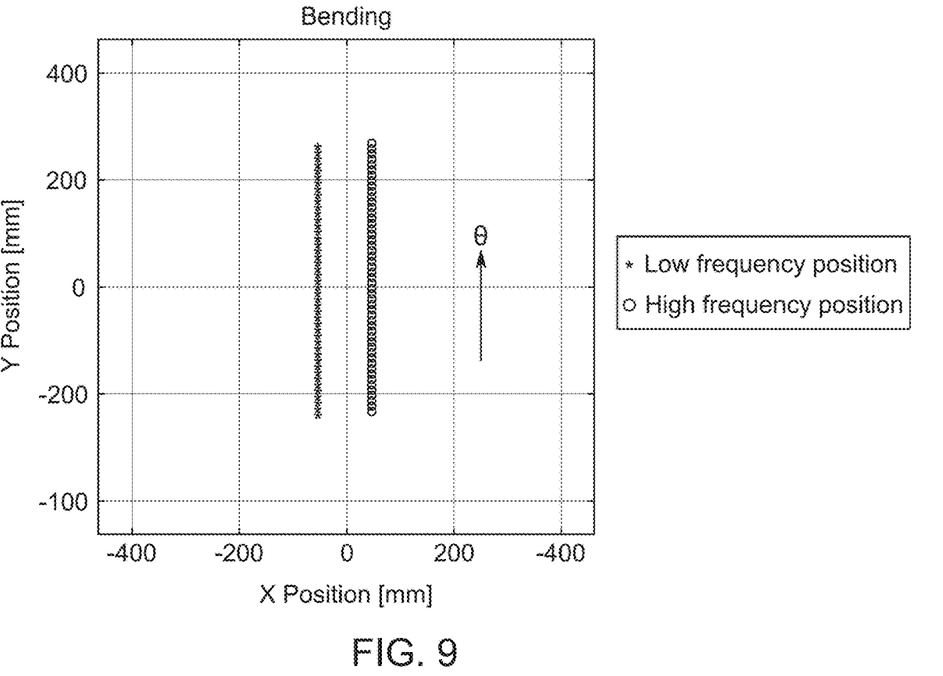
FIG. 9 shows experimental results demonstrating measurement of bending with two light sources and a non-discrete PSD.

FIG. 9 shows experimental results demonstrating measurement of bending with two light sources and a non-discrete PSD (S 1880 Hamamatsu) and a 50 mm focusing lens, 5 m from two LED light sources having 11 cm center distance. The total 50 cm light source bending was in the x-direction of the set-up. The radiant power of each lamp is 2.6 Wand the NIR wavelength is 850 nm. The modulation frequencies are 2.5 and 5 kHz respectively. Data are digitized using a DAQ card from National Instruments with a sampling rate of 50 kHz. The signal processing is carried out using Matlab software. As seen from this experiment bending can be measured by means of a single light source and/or a one-dimensional PSD because the X-position does not change.

Figure 10:
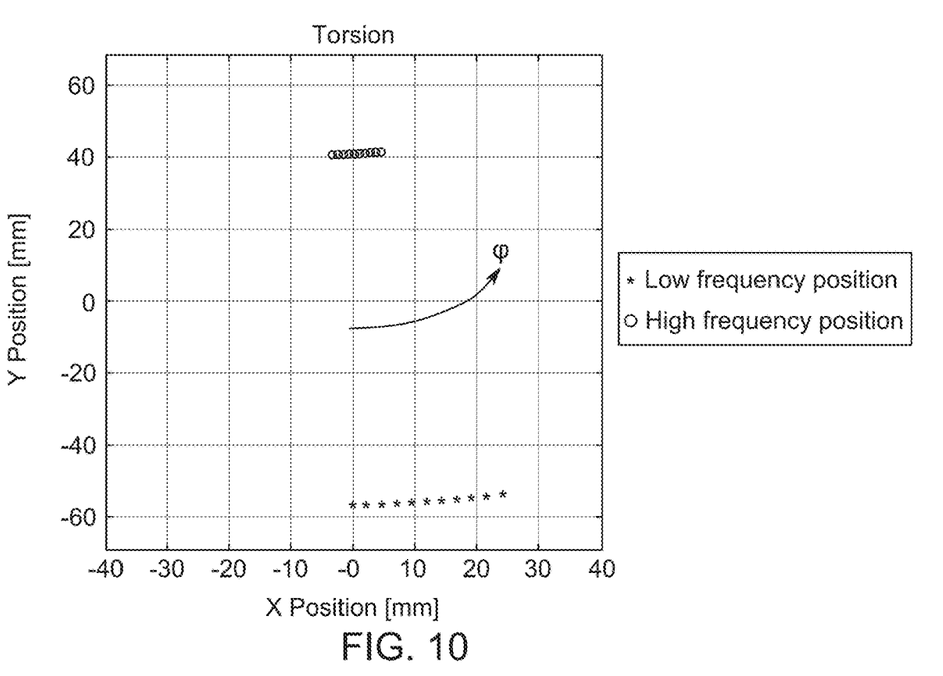
FIG. 10 shows experimental results demonstrating measurement of torsion with two light sources and a non-discrete PSD.

FIG. 10 shows experimental results demonstrating measurement of torsion with two light sources and a non-discrete PSD. FIG. 8 shows experimental results using a PSD (S1880 Hamamatsu) and a 50 mm focusing lens, 5 m from two LED light sources having 11 cm center distance. The light sources demonstrated a maximum 16-degree torsion. The radiant power of each lamp is 2.6 Wand the NIR wavelength is 850 nm. The modulation frequencies are 2.5 and 5 kHz respectively. Data are digitized using a DAQ card from National Instruments with a sampling rate of 50 kHz. The signal processing is carried out using Matlab software.

The invention is described above with reference to some currently preferred embodiments. It is however realized that other variants and embodiments can be carried out without departing from the accompanying claims.

What is claimed:

1. A blade motion tracking system for installation on a wind turbine blade, where the wind turbine blade comprises a blade root and a blade tip, and a leading edge and a trailing edge with a chord length extending therebetween of each blade section; said system comprising
    at least one light module comprising a first light source in a blade section at a predetermined distance from the blade root, said first light source configured to emit light modulated in intensity over time at a predefined modulation frequency, and
    an optical measuring device adapted to receive light emitted from the first light source, and wherein the optical measuring device comprises at least one non-discrete position sensitive detector (PSD) for identifying the position of the first light source relative to the position sensitive detector, and wherein the optical measuring device is configured for distinguishing the first light source from ambient light conditions based on the predefined modulation frequency.

2. The system according to claim 1, wherein the light module is provided near the blade tip.

3. The system according to claim 1, wherein the optical measuring device, or at least a PSD thereof, is provided at the blade root.

4. The system according to claim 1, wherein the PSD is a one-dimensional PSD or at least a two-dimensional PSD.

5. The system according to claim 1, wherein the light module comprises at least a second light source, adapted to emit light in the direction of the blade root, the first and second light sources provided on or near the leading edge and the trailing edge respectively in a blade section at a predetermined distance from the blade root, and wherein the optical measuring device is configured for receiving light emitted from the light sources, and wherein the PSD is at least a two-dimensional PSD configured for identifying the position of each of the first and second light sources relative to the PSD.

6. The system according to claim 5, wherein the second light source is modulated with a predefined modulation frequency, which is different from the modulation frequency of the first light source, and wherein the optical measuring device is configured for distinguishing the first light and second light sources 1) from each other based on the different modulation frequencies, and 2) from ambient light conditions based on the predefined modulation frequencies.

7. The system according to claim 5, wherein a multiple of modulation frequencies are used for the light sources.

8. The system according to claim 1, wherein the PSD is provided with a lens and an optical filter adapted to receive the light from the first light source through said lens and said filter.

9. The system according to claim 1, wherein the position sensitive detector further comprises a signal processing system for demodulating an output signal from the PSD to identify the relative position of the first light source and optionally the second light source.

10. The system according to claim 1, wherein one or more further light modules are provided in one or more blade sections between the root and the tip region, and wherein the optical measuring device is capable of identifying each of the light sources in the multiple light modules.

11. The system according to claim 1, wherein the light source(s) is an LED or a laser.

12. A method for tracking the motion of a blade of a wind turbine, where the wind turbine blade comprises a blade root and a blade tip, and a leading edge and a trailing edge with a chord length extending therebetween of each blade section; the method comprising the steps of:
    providing at least a first light module comprising at least a first light source configured to emit light modulated in intensity over time at a predefined modulation frequency;
    providing a non-discrete position sensitive detector (PSD) adapted to receive light emitted from the first light source of said first light module, and
    distinguishing the first light source from ambient light by means of the predefined modulation frequency, and identifying the relative position of first light source, by means of the position sensitive detector.

13. The method according to claim 12, wherein the at least first light module further comprises at least a second light source, and wherein the first and second light sources are provided on the leading edge and the trailing edge, respectively, in a predetermined blade section, said first and second light sources being frequency modulated with different predefined modulation frequencies providing an optical measuring device adapted to receive the light emitted from the light sources of said first light module, and distinguishing each light source based on the different modulation frequencies and identifying the relative position of each of the light sources in the position sensitive detector.

14. The method according to claim 12, wherein the light module is provided near or on the tip of the blade and wherein the optical measuring device, or at least a PSD thereof, is provided at the blade root.

15. The method according to claim 12, wherein the PSD is a one-dimensional PSD.

16. The method according to claim 12, whereby the method is performed with a data rate allowing for real-time tracking of the blade motion.

17. The method according to claim 12, whereby the tracking of the blade motion includes a plurality of light modules with synchronised light sources on the leading edge and trailing edge of a multiple of blade sections.

18. The method according to claim 17, whereby the light source(s) is/are provided on a rear side of the wind turbine blades.

19. A method of controlling a wind turbine having a rotor with a plurality of wind turbine blades the wind turbine having a blade motion tracking system comprising; at least one light module comprising a first light source in a blade section at a predetermined distance from a blade root, said first light source configured to emit light modulated in intensity over time at a predefined modulation frequency, and an optical measuring device adapted to receive light emitted from the first light source, and wherein the optical measuring device comprises at least one non-discrete position sensitive detector (PSD) for identifying the position of the first light source relative to the position sensitive detector, and wherein the optical measuring device is configured for distinguishing the first light source from ambient light conditions based on the predefined modulation frequency:

wherein at least a wind turbine blade pitch and a yaw of the rotor are controlled using measurements of blade tracking by performing a method according to claim 12.

* * * * *